United States Patent [19]
Argentino

[11] Patent Number: 5,941,186
[45] Date of Patent: Aug. 24, 1999

[54] HIGH SECURITY FABRIC

[76] Inventor: Giovanni Argentino, 5025, Wellington, Verdun, Quebec, Canada, H4G 1Y1

[21] Appl. No.: 09/015,274

[22] Filed: Jan. 29, 1998

[51] Int. Cl.⁶ .................................................. B32B 7/08
[52] U.S. Cl. ........................... 112/441; 112/425; 112/117; 442/301; 2/81; 428/921; 428/911
[58] Field of Search ..................... 112/441, 425, 112/117, 475.17, 475.26, 162, 440; 442/378, 255, 301; 428/474.9, 475.2, 908.8, 911, 920, 921; 2/2.5, 81, 458

[56] References Cited

U.S. PATENT DOCUMENTS

| | | | |
|---|---|---|---|
| 3,582,988 | 6/1971 | Armellino | 2/2.5 |
| 3,916,448 | 11/1975 | Hamel | 2/2.5 |
| 4,753,182 | 6/1988 | Blackburn | 112/441 X |
| 5,172,426 | 12/1992 | Capello | 2/81 |
| 5,395,671 | 3/1995 | Coppage, Jr. et al. | 422/301 X |
| 5,539,928 | 7/1996 | Aldridge | 2/81 X |

*Primary Examiner*—Ismael Izaguirre
*Attorney, Agent, or Firm*—Robic

[57] ABSTRACT

A high-security fabric for use in high-security applications comprising an inner layer of nylon having top and bottom surfaces, two inner layers of polyester, one of the inner layers of polyester extending on the top surface of the inner layer of nylon, the other inner layer of polyester extending on the bottom surface of the inner layer of nylon, and two outer layers of a fireproof synthetic fabric, each outer layer of fireproof synthetic fabric extending on one of the inner layers of polyester opposite to the inner layer of nylon. All of the layers form a 5-ply assembly having a top and a bottom and in which the inner layer of nylon is centrally positioned. The assembly is stitched together with a nylon thread in a pattern.

11 Claims, 2 Drawing Sheets

HIGH SECURITY FABRIC

FIELD OF THE INVENTION

The invention relates to a fabric for use in high-security applications, such as the manufacture of garments or blankets for prisoners or the like.

DESCRIPTION OF THE PRIOR ART

In prisons, or other high security areas such as asylums, there exists the possibility that inmates (or interned persons), have suicidal tendencies. In such cases, the interned persons will sometimes try to set fire to their clothes, or blankets, or any other fabric or material available, inside their cell. Other will try to rip the fabric apart or to take the stitches out in order to attempt hanging themselves. Some interned persons succeed because the fabric which makes up the garments and/or blankets is not fire-retardant or strong enough to resist. It should be noted that although such interned persons generally do not have access to sharp objects, in some cases the stitches can be undone by using the person's fingers or nails to break the stitches.

There exists therefore a need to provide an improved fabric that would be non-flammable, would resist tearing and could not be unstitched.

SUMMARY OF THE INVENTION

In accordance with the invention, this object is achieved with a high security fabric for use in high-security applications, comprising:

- an inner layer of nylon, the inner layer of nylon having top and bottom surfaces;
- two inner layers of polyester, one of the inner layers of polyester extending on the top surface of the inner layer of nylon, the other inner layer of polyester extending on the bottom surface of the inner layer of nylon;
- two outer layers of a fireproof synthetic fabric, each outer layer of fireproof synthetic fabric extending on one of the inner layers of polyester opposite to the inner layer of nylon,
- wherein all of the layers form a 5-ply assembly having a top and a bottom and in which the inner layer of nylon is centrally positioned, and wherein said assembly is stitched together with a nylon thread in a pattern.

BRIEF DESCRIPTION OF THE DRAWINGS

The present invention and its advantages will be more easily understood after reading the following non-restrictive description of preferred embodiments thereof, made with reference to the following drawings where the same numeral designates the same feature in all of the drawings.

DESCRIPTION OF PREFERRED EMBODIMENTS

Figure 1:
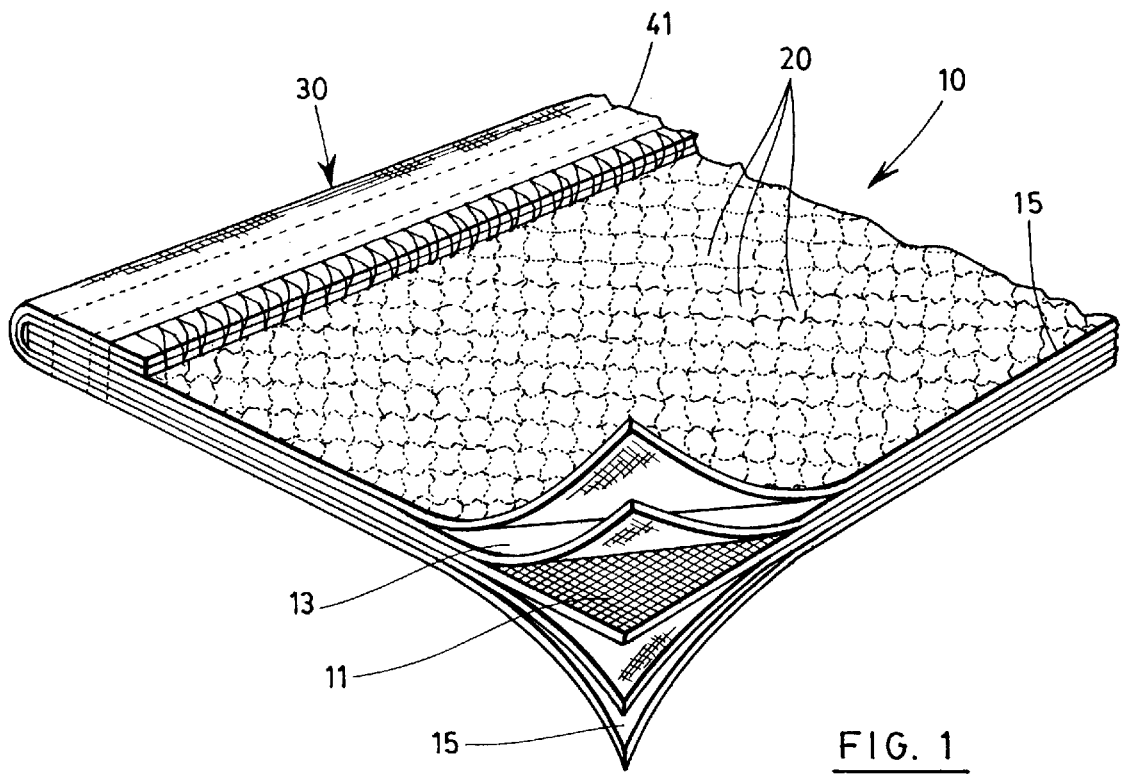
FIG. 1 is a perspective view of a fabric according to a first preferred embodiment of the invention for the stitching.

FIG. 1 shows a 5-ply assembly for a fabric 10 according to the invention. The assembly is composed of an inner layer of nylon 11, two inner layers of polyester 13, each extending on each surface of the layer of nylon 11 and two outer layers of a fireproof synthetic fabric 15 each extending on one of the inner layers of polyester 13, so that the nylon 11 layer is centrally positioned and each surface of the nylon 11 layer has a layer of polyester 13 on top of which is a layer of the fireproof synthetic fabric 15. Preferably, this fireproof synthetic fabric 15 is one available under the trade-mark NOMEX and available through CONSOLTEX as product 784657 NOMEX 200-A.

All of the layers 11, 13, 15 are stitched together in a pattern in order to secure the 5-ply assembly together. Preferably, this pattern is a "quilt pattern" 20, as shown on FIG. 1 where the rows of stitches are separated by approximately 1¼. However, this pattern could also be a diagonal cross-hatch 20' as shown on FIG. 2 where each row of stitches is separated by approximately 1". The embodiment shown on FIG. 2 has the net result that the assembly is much more resistant to tearing, as will be explained hereinafter.

If the pattern is the quilt pattern 20 of FIG. 1, it is preferable for the thread used to stitch the assembly have a resistance of approximately 6.9 pounds and a thread count of about 10 points/inch.

However, if the pattern that is used is the diagonal cross-hatch 20', the nylon thread that is used for stitching together the assembly preferably has a resistance of approximately 6.9 pounds but has a thread count of approximately 12 points per inch.

The fabric 10 according to the invention, may also include at least one hem 30 as shown on FIGS. 1 to 4. It should be understood that if the fabric 10 is used to make a blanket, all of the sides of the blanket will be hemmed. Also, should the fabric 10 be used to make garments, all of the edges of the garment should be hemmed (i.e. sleeves, lower edges, etc.) so that the resulting garment cannot be unstitched.

Figure 3:
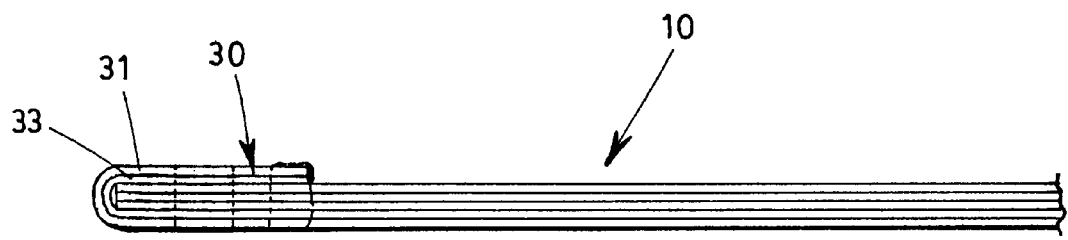
FIG. 3 is a cross-sectional view of the fabric showing a preferred embodiment for the hem.

In a preferred embodiment, the hem 30 is constructed from an extension 31 of at least one layer of fireproof synthetic fabric 15 and an extension 33 of at least one layer of polyester 13 where these two extensions 31, 33 are folded over from one of the top or bottom towards the other of the top or bottom. As can be seen in FIGS. 1 and 3, the hem 30 is made from the extension of the layer of fireproof synthetic fabric 15 and polyester 13 which is folded over from the bottom towards the top. These extensions 31, 33 are stitched to the assembly as shown on FIGS. 1 and 3 with another nylon thread. Preferably, the other nylon thread which is used for stitching the hem 30 has a resistance of approximately 16 pounds and has a thread count of about 10 points/inch. Also preferably, the hem is stitched to the assembly by four rows of stitches 41 as can be seen on FIGS. 1, 3 and 4. This substantially increases the strength of the hem 30.

Figure 4:
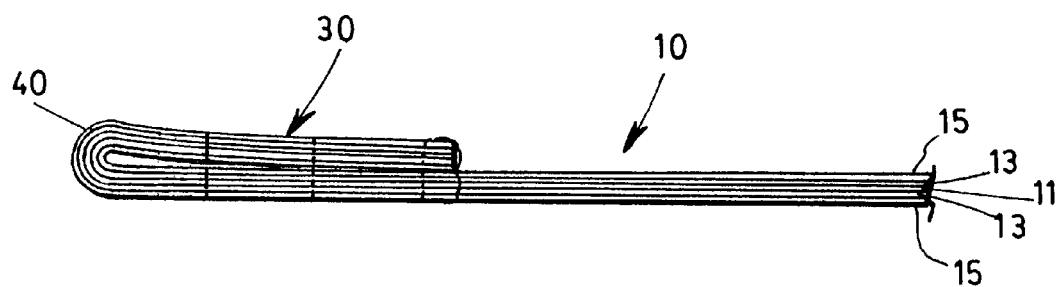
FIG. 4 is a cross-sectional view of the fabric showing another preferred embodiment for the hem.

In another embodiment, the hem 30 could be made of the extension 40 of all of the layers 11, 13, 15 folded over, shown on FIG. 4. In this other embodiment also, the other nylon thread which is used to stitch the extension to the fabric in order to form the hem 30, preferably has a resistance of 16 pounds and a thread count of about 10 points/inch. Also preferably, this other nylon thread is stitched in four generally parallel rows 41 to the assembly.

In a preferred embodiment of the invention, the nylon layer is preferably bullet-proof. To that effect, this nylon layer preferably has a warp count of 34/inch and a weft count of 34/inch. It is also preferable for the NOMEX layer to have a warp count of 69/inch and a weft count of 48/inch. Accordingly, the nylon that is used for the nylon layer is preferably the one sold by CONSOLTEX under the tradename 784489 HT NYLON 35×35.

In order to evaluate the resistance of the fabric to various events, the following tests were performed: the first one was a flammability test, the second one was a test for the resistance to the breakage of the seams, the third one was a test for the resistance to ripping. The results showed that of six specimens tested, none ignited.

With respect to the breaking strength to the seams, a dynamometer with a constant rate of extension was used on the existing seams. For the seams parallel to the warp, the average breaking level was 3,161.9 newtons or 124.5 pounds/foot. What was noticed during the breaking test of the seams parallel to the warp was that the exterior layers of NOMEX broke at the seams. With respect to the seams parallel to the weft, the average breaking force was 3,747.6 newtons or 147.5 pounds/foot. During this test, it was noticed that the seams broke at these levels.

As to ripping strength, a dynamometer with a constant rate of extension was used and the average force required for ripping the fabric in the direction parallel to the warp was 461 newtons or 103.6 pounds/foot; with respect to the force required to rip the fabric in the direction of the weft, the force was 615.4 newtons or 138.3 pounds/foot.

It should also be noted that an "extension" test was performed, where the fabric was longitudinally stretched; the fabric resisted up to 1000 lbs, and only the NOMEX layer ripped.

These tests were performed on a fabric as shown on FIG. 1.

Figure 2:
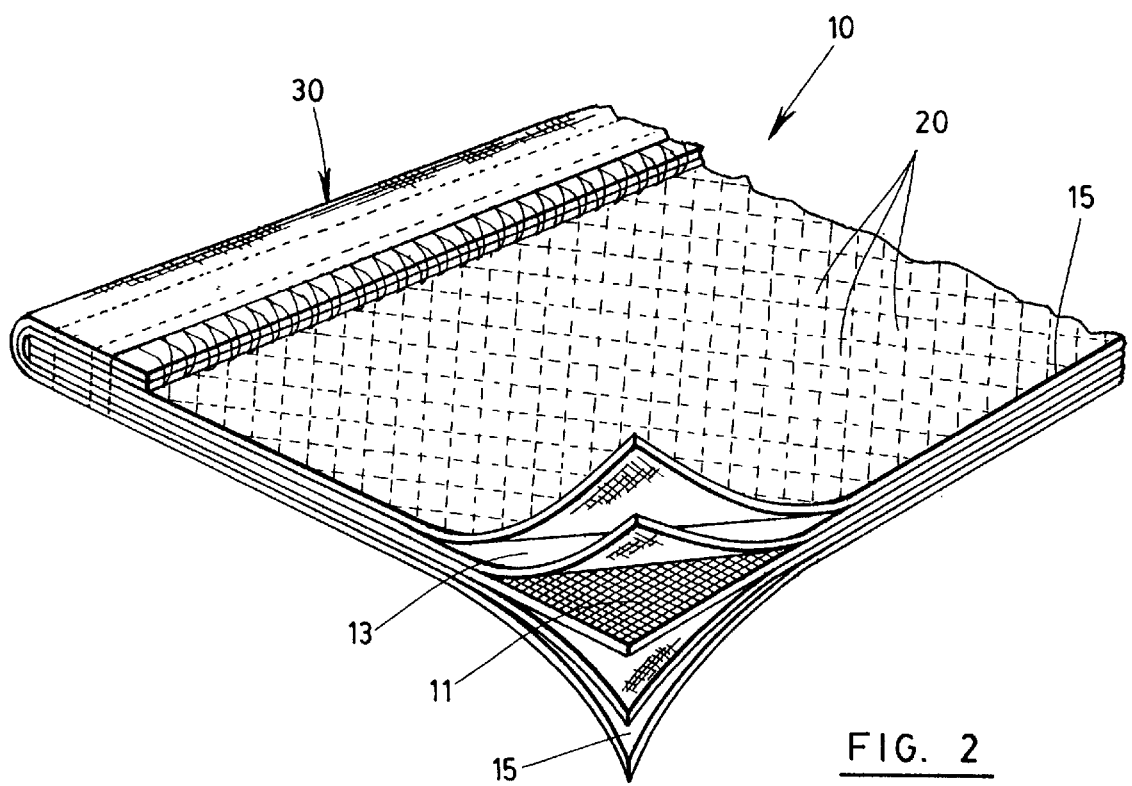
FIG. 2 is a perspective view of the fabric according to a second preferred embodiment of the invention for the stitching.

It is also to be noted that should the pattern be the diagonal cross-hatches 20' shown on FIG. 2, the strength of the stitching which binds the 5 layers of fabric together is in the order to 10 to 15 pounds stronger than the quilt 20 pattern.

Accordingly, the fabric according to the invention, comprising the five different layers of individual fabrics stitched together and in some cases hemmed, is an appropriate fabric for the manufacture of clothing for use in high-security applications such as prisons or asylums where some of the interned persons may have suicidal tendencies. This fabric resists flammability and it is very difficult to pick at the stitches in order to recuperate the nylon thread to attempt hanging oneself. The fabric also resists ripping in order to recuperate the resulting shreds of fabric. Furthermore, since the hem is stitched four times, it more than adequately resists picking with the finger-nail to try unsew the stitch. This is due to, first of all, the strength of the nylon thread used and secondly, to the quadruple lines of stitching.

The present invention has been explained hereinabove by way of preferred embodiments thereof. It should be pointed out any modifications to these preferred embodiments within the scope of the claims is not deemed to alter or change the nature and scope of the present invention. For example, any other type of pattern for stitching the five layers together is acceptable as long as it provides the necessary strength and is of sufficiently small thread count so that it cannot be easily undone with a person's hands. Also, the preferred types of fabric which have been identified above could be replaced by the same fabrics having different grains, again as well, as long as the resulting assembly provides the necessary strength and resistance.

I claim:

1. A high-security fabric for use in high-security applications comprising:

an inner layer of nylon, said inner layer of nylon having top and bottom surfaces;

two inner layers of polyester, one of said inner layers of polyester extending on said top surface of said inner layer of nylon, the other inner layer of polyester extending on said bottom surface of said inner layer of nylon;

two outer layers of a fireproof synthetic fabric, each outer layer of fireproof synthetic fabric extending on one of the inner layers of polyester opposite to the inner layer of nylon wherein all of said layers form a 5-ply assembly having a top and a bottom and in which inner layer of nylon is centrally positioned, and wherein said assembly is stitched together with a nylon thread in a pattern.

2. A fabric according to claim 1, wherein said fabric further includes at least one hem, said at least one hem being formed by an extension of at least one of said outer layers of a fireproof synthetic fabric and by an extension of at least one of said inner layers of polyester, said extensions being folded over from one of said top or bottom towards the other of said top or bottom, and being stitched to said assembly with another nylon thread.

3. A fabric according to claim 2, wherein said patter is a quilt pattern, and wherein the nylon thread for stitching together said assembly has a resistance of approximately 6.9 pounds, and has a thread count of about 10 points per inch.

4. A fabric according to claim 3, wherein said quilt pattern is formed by rows of stitches separated by approximately 1¼.

5. A fabric according to claim 4, wherein said extension is stitched four times with said other nylon thread.

6. A fabric according to claim 3, wherein said other nylon thread has a resistance of approximately 16 pounds and has a thread count of about 10 points per inch.

7. A fabric according to claim 2, wherein said pattern is a generally diagonal cross-hatch, and wherein the nylon thread for stitching together said assembly has a resistance of approximately 6.9 pounds, and has a thread count of 12 points per inch.

8. A fabric according to claim 7, wherein said generally diagonal cross-hatch is formed by rows of stitches separated by approximately 1.1.

9. A fabric according to claim 1, wherein said fabric further includes at least one hem, said at least one hem being formed by an extension of all of said layers, said extension being folded over from one of said top or bottom towards the other of said top or bottom, and being stitched to said assembly with another nylon thread.

10. A fabric according to claim 1, wherein said nylon layer is bullet-proof.

11. A fabric according to claim 1, wherein:

said nylon layer has a warp count of 34/inch and a weft count of 34/inch; and said fireproof synthetic fabric layer has a warp count of 69/inch and a weft count of 48/inch.

* * * * *